United States Patent
Lindenbaum

(10) Patent No.: US 7,181,371 B2
(45) Date of Patent: Feb. 20, 2007

(54) APPARATUS AND METHOD FOR INPUTTING MEASUREMENTS INTO A SOFTWARE PRODUCT TO CONSTRUCT SOFTWARE MODELS OF ARCHITECTURAL STRUCTURES

(75) Inventor: Michael Neil Lindenbaum, Denver, CO (US)

(73) Assignee: Eflection, Inc., Denver, CO (US)

( * ) Notice: Subject to any disclaimer, the term of this patent is extended or adjusted under 35 U.S.C. 154(b) by 501 days.

(21) Appl. No.: 10/691,096

(22) Filed: Oct. 22, 2003

(65) Prior Publication Data

US 2005/0091007 A1     Apr. 28, 2005

(51) Int. Cl.
  G06F 17/50   (2006.01)
(52) U.S. Cl. .............................. 703/1; 703/22; 345/419
(58) Field of Classification Search .................... 703/1, 703/6, 22; 345/619, 419; 235/462.01; 701/213
See application file for complete search history.

(56) References Cited

U.S. PATENT DOCUMENTS 5,988,862 A * 11/1999 Kacyra et al. .................. 703/6
6,517,001 B1 * 2/2003 Knowles et al. ....... 235/462.01
6,526,352 B1 * 2/2003 Breed et al. ................. 701/213
2003/0218617 A1 * 11/2003 Ohto .......................... 345/619

OTHER PUBLICATIONS

Kris et al., N. Virterf, A Vision on Heritage Conservation, IEEE, Seventh International Conference on Virtual Systems and Multimedia, Oct. 2001, pp. 191-200.*
Hahnel et al., D. Learning Compact 3D Models of Indoor and Outdoor Environments with a Mobile Robot, Robotics and Autonomous Systems, vol. 44, Iss. 1, Jul. 2003, pp. 15-27.*
Birch et al., P.J. Rapid Procedural-Modeling of Architectural Structures, Proceedings of the 2001 Conference on Virtual Reality, Archeology, and Cultural Heritage, Nov. 2001, pp. 187-196.*
Debevec et al., P.E. Modeling and Rendering Architecture from Photographs: A Hybrid Geometry—and Image-Based Approach, Proceedings of the 23rd Annual Conference on Computer.*

* cited by examiner

Primary Examiner—Russell Frejd
(74) Attorney, Agent, or Firm—Hogan & Hartson LLP

(57) ABSTRACT

In accordance with the present invention, an apparatus and method for creating a model, including the third dimension (3D), in a CAD program directly from a laser or sonar measuring device. As the measurements of an architectural structure are taken and as numeric codes are entered into the keypad of the laser or sonar measuring device, the invention receives the data on a laptop, PC, or other computing device, interprets the data, and consequently engages commands in the CAD program to create a 3D file reflecting the architectural space being measured by the user.

3 Claims, 6 Drawing Sheets

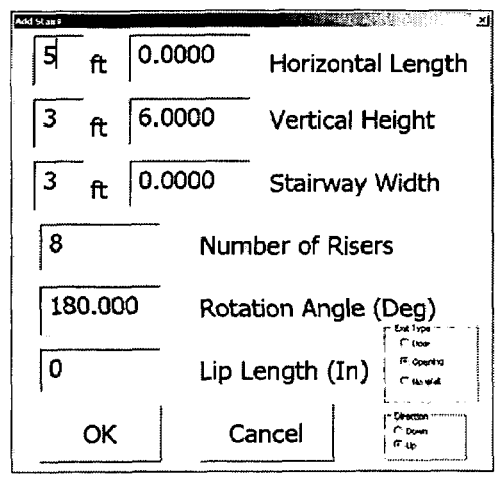
Figure 8
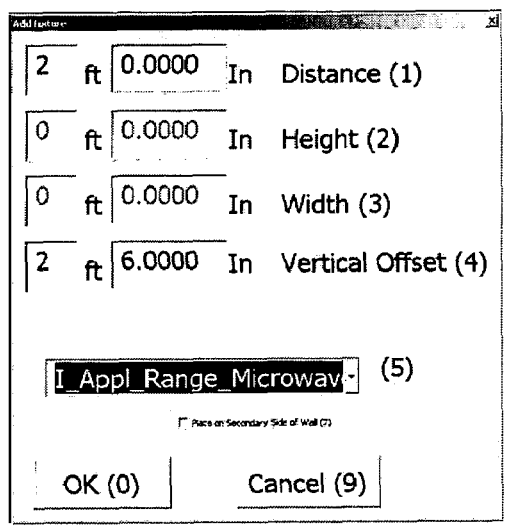 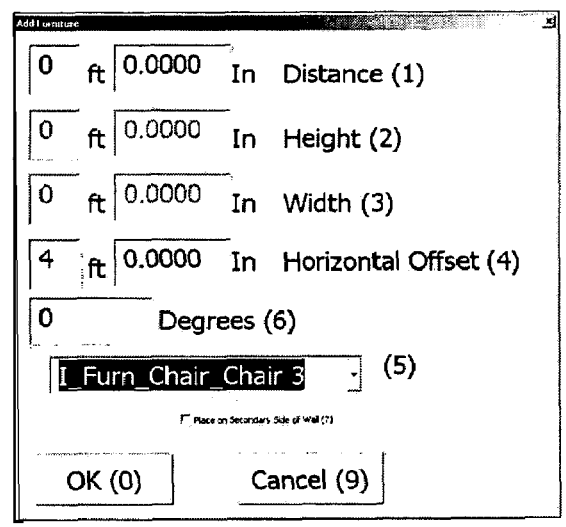
Figure 9                                   Figure 10

APPARATUS AND METHOD FOR INPUTTING MEASUREMENTS INTO A SOFTWARE PRODUCT TO CONSTRUCT SOFTWARE MODELS OF ARCHITECTURAL STRUCTURES

FIELD OF THE INVENTION

The present invention relates to the creation of scaled computer models and more particularly to an apparatus and method of inputting measurements of a physical structure into a computer modeling software package.

BACKGROUND OF THE INVENTION

Traditionally, measuring existing buildings for the purpose of creating as-builts or CAD files has been done using a measuring tape (or similar measuring device) and physically drawing a floor-plan on paper. If needed, the drawing was then re-created in a CAD software program. The process is slow and difficult to ensure accuracy.

SUMMARY OF THE INVENTION

The present invention is directed to an apparatus and method for utilizing a laser measuring device and a parametric Computer Aided Design (CAD) software program to construct a 3-dimensional architectural model/file in real time. According to the invention, a measuring device is used to measure architectural structures, such as, walls, windows, doors and the like, and the measurements are automatically input into the CAD software for construction of the architectural model.

When a measurement is taken, the software of the present invention (also referred to as middleware, as in the software interfacing between the measuring device and CAD software) interprets the data that is designated by the user to be a wall, window, door, etc. . . . , or a measurement. The middleware then instructs the CAD Software to build this structure thus creating a wall, window, door, etc. within the software. It is therefore possible to construct rooms, floors, houses and the like in 2 Dimensions (2-D) and 3 Dimensions (3-D) by utilizing the measuring device, middleware and CAD software. This is a vast improvement on previous methods that are known in the art, which include, for example:

1) A user would measure an architectural feature and manually add the feature and measurements into the CAD software.
2) A user would measure using a laser or sonar device and automatically add a 2D only feature into a CAD software. This method would not be building 3D, parametric objects, but rather simple structures such as lines that are labeled as objects.

This middleware allow the measurements to be directly input into the CAD software eliminating a laborious manual step that could result in human error and drastically reduce the time it takes a user to build a model inside a CAD software product. Additionally, it drastically reduces the amount of training it would take for an individual to build a 2-D or 3-D model on a CAD software product.

The middleware could be designed for a user to utilize a dialog box designed to create a particular architectural feature, such as a wall. The user then could use a measuring device, such as a laser device, to automatically populate this dialog box that is specific to an architectural feature. For instance, in the case of wall and measuring in three dimensions (3-D), the user could measure the length of the wall and this measurement would populate the "length" requirement in the Dialog Box. The process would be similar for all other measurements. When the measurements were complete for that particular feature the user could then instruct the middleware, through a keystroke or other operation, to build that particular feature with the measurements that were just taken.

This middleware could also used be used in conjunction with measurements taken by a manual process to speed the process of building a model with a CAD software program. Manual measurements could be input into appropriate dialog boxes, which would interface with the CAD software to create the appropriate architectural model.

BRIEF DESCRIPTION OF THE DRAWINGS

FIG. 8 shows a sample user interface screen of an embodiment of the present invention for the Add Stairs dialog box.

FIG. 9 shows a sample user interface screen of an embodiment of the present invention for the Add Fixture dialog box.

FIG. 10 shows a sample user interface screen of an embodiment of the present invention for the Add Furniture dialog box.

DETAILED DESCRIPTION OF THE INVENTION

Figure 1:
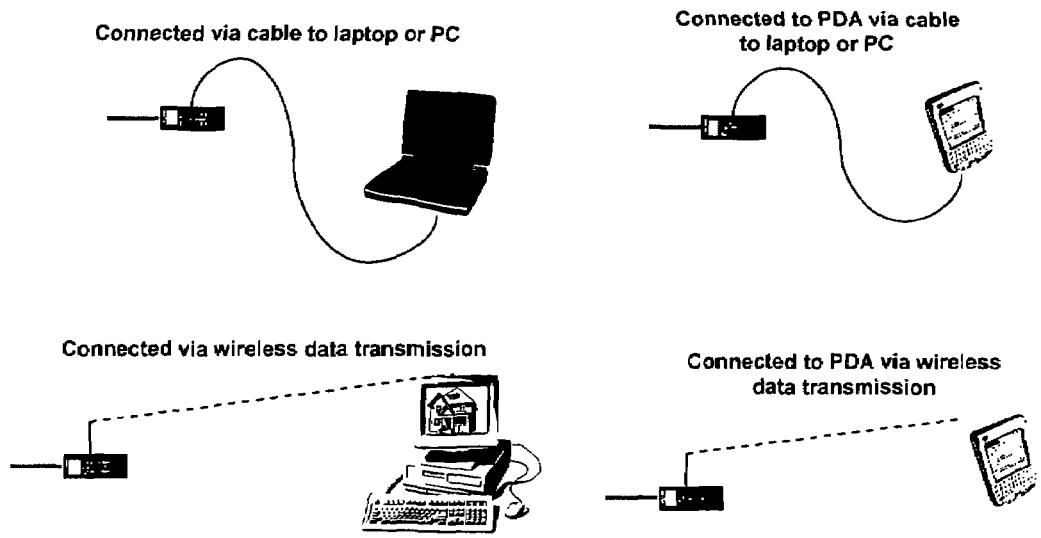
FIG. 1 shows samples of the apparatus according to four embodiments of the present invention. The first embodiment shows the laser measuring device connected to a laptop or PC via a cable. The second embodiment shows the laser measuring device connected to a laptop or PC via a wireless data connection. The third embodiment shows the laser measuring device connected to a PDA or handheld computing device via cable. The fourth embodiment shows the laser measuring device connected to a PDA or handheld computing device via wireless connection.

FIG. 1 shows the apparatus according to one embodiment of the present invention. A computer (1) contains a CAD software program (2) as known in the art, such as AUTOCAD™, for example. In addition, the computer contains the middleware (3) of the present invention. A measuring device (4), such as a Leica DISTO™ handheld laser measuring device, is connected to the computer (1) and is used to input measurements directly into the computer (1) without the need for manually inputting data. The measuring device (4) could be connected by electrical cable (5), or alternatively, could be a wireless device that transmits signals to the computer via infrared, radio, or other wireless signal transmissions as are known in the art.

Figure 2:
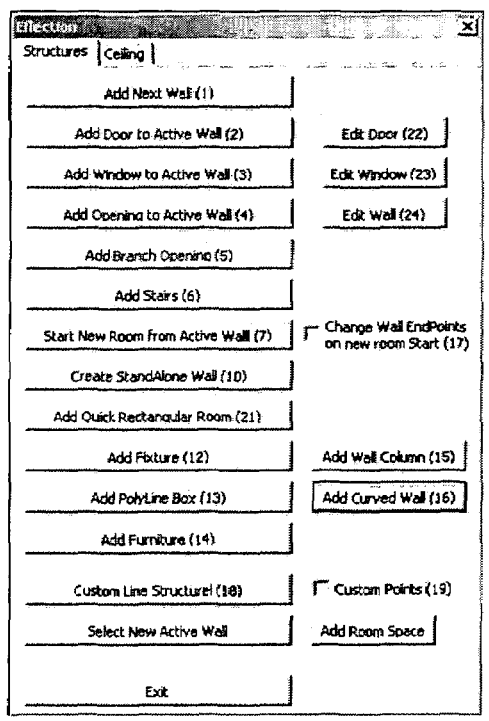
FIG. 2 shows a sample user interface screen of an embodiment of the present invention for the main Eflection dialog box.

FIG. 2 shows a sample user interface screen (10) of an embodiment of the present invention for the Main Dialog box, from which most of the invention's functionality can be initiated. When the buttons (11–25) on the dialog box are either (a) clicked with the mouse cursor, or (b) initiated by entering numeric codes on the keypad of the Leica DISTO handheld laser measuring device, other dialog boxes are initiated which prompt and enable the user to enter measurement information via the DISTO and/or the keyboard and/or the mouse. Additionally, there is one function for which the logic is programmed into the code for this particular dialog box. When the 'Change Wall EndPoints on new room Start (17)' function is initiated on the dialog box, the user is able to begin measuring a room that is on the opposite side of a wall that has already been measured (i.e. two rooms that are side-by-side with a shared wall).

Figure 3:
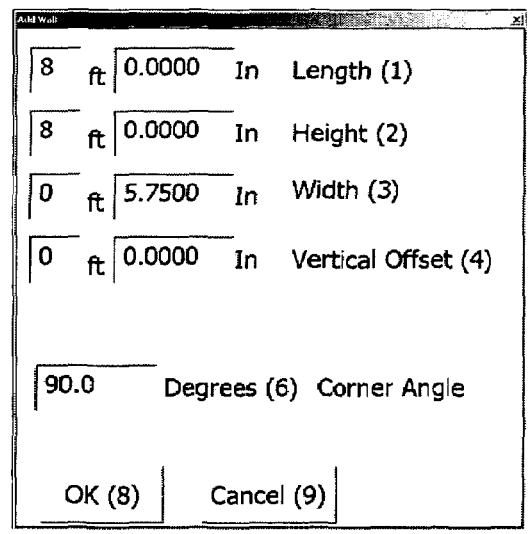
FIG. 3 shows a sample user interface screen of an embodiment of the present invention for the Add Wall dialog box.

FIG. 3 shows a sample user interface screen of an embodiment of the present invention for the Add Wall dialog box. This dialog box is initiated from the Main dialog box and can be initiated by one of two buttons. If it is initiated by the 'Create StandAlone Wall (10)' button, than it places the resulting wall with a beginning point at the origin (0,0,0) inside the AutoCAD file. If it is initiated by the 'Add Next Wall (1)' button, than it places the resulting wall with a beginning point at endpoint of the currently 'active' or 'selected' wall inside the AutoCAD file. The dialog box prompts the user to measure certain dimensions of a physical wall using the DISTO, or if measured manually using another measuring device (e.g. measuring tape), to enter the measurements into the designated fields using the mouse and/or keyboard. The fields are length of the wall from one corner to the opposite corner; the height of the wall from top to bottom (usually ceiling to floor), the width or thickness of the wall, the vertical offset of the wall if the bottom of the wall is not the same as the bottom of the structure currently being measured, and the degrees of the corner angle that the wall sits with respect to the currently active wall in the AutoCAD file. For example, if walking around a room in a clockwise direction while measuring, and if the room itself is rectangular and orthogonal, than the user should make four 90 degree turns while measuring.

Figure 4:
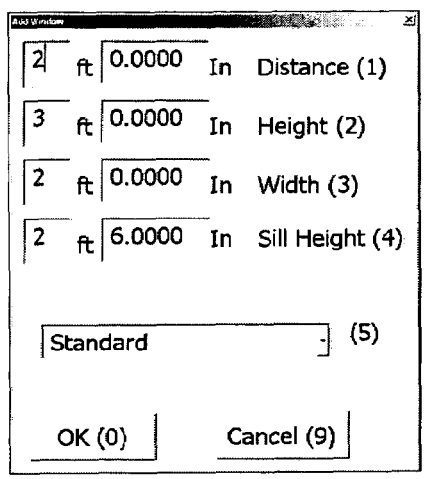
FIG. 4 shows a sample user interface screen of an embodiment of the present invention for the Add Window dialog box.
Figure 5:
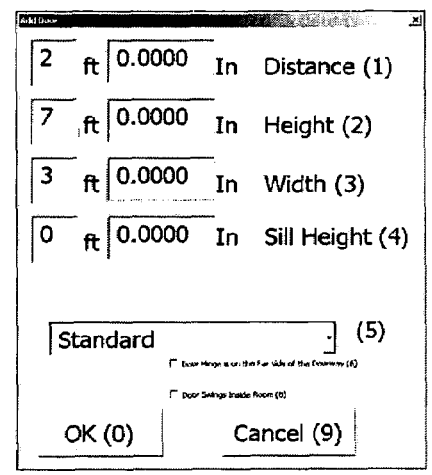
FIG. 5 shows a sample user interface screen of an embodiment of the present invention for the Add Door dialog box.

FIGS. 4 & 5 show sample user interface screens of an embodiment of the present invention for both the Add Window dialog box and the Add Door dialog box. The two dialogs use similar logic. The user is prompted to measure the distance from the beginning of the active wall to the beginning of the door or window. Then the user is prompted to measure and enter the height of the door or window, the width from one side to the other of the door or window, and the sill height of the door or window. Then, the user can select from a drop down listbox of a variety of door and window types for the one that applies most closely to the object being measured. Further, for a door, the user can enter into the dialog box the side of the door on which the hinge exists (with respect to the room inside which the measurer is currently operating) and which direction the door swings. Upon selecting the 'OK(0)' button, the door or window gets added to the active wall in the file.

Figure 6:
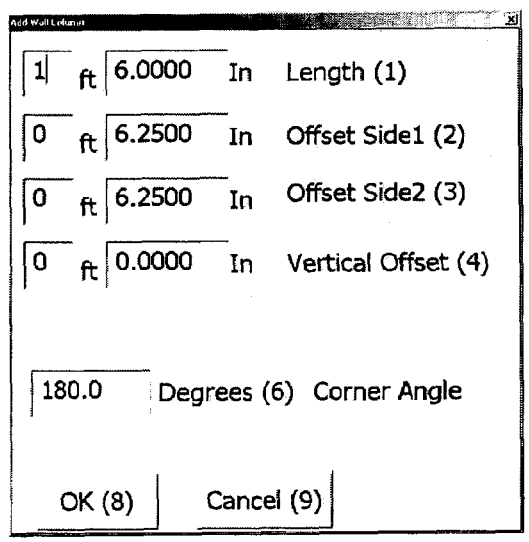
FIG. 6 shows a sample user interface screen of an embodiment of the present invention for the Add Wall Columns dialog box.

FIG. 6 shows a sample user interface screen of an embodiment of the present invention for the Add Wall Column dialog box. When the user wants to measure a column (or similar object) that is attached to a wall (as opposed to a free-standing column), he uses this dialog box. The dialog prompts the user to measure the length of the column along the wall (this is the side that is parallel to the active wall), and to measure the offsets (the two sides of the column that are perpendicular to the wall). When the user enters the first offset into 'Offset Side1 (2)', the value of the 'Offset Side2 (3)' field is automatically populated with the same value until it is changed by the user. This enables time savings if the two offsets of the column are the same measurement. The default angle measurement in this dialog box is set at 180 degrees.

Figure 7:
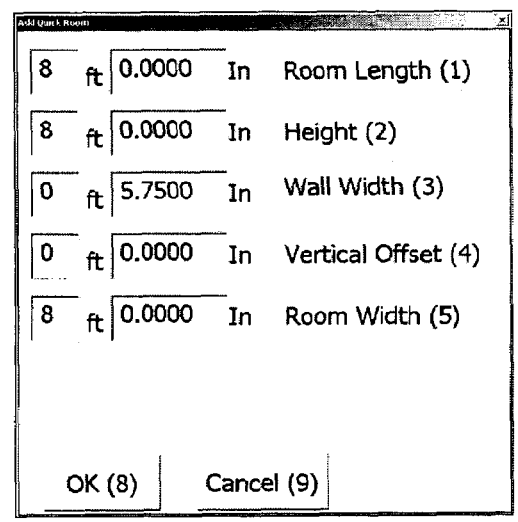
FIG. 7 shows a sample user interface screen of an embodiment of the present invention for the Add Quick Room dialog box.

FIG. 7 shows a sample user interface screen of an embodiment of the present invention for the Add Quick Rectangular Room dialog box. This dialog is designed to save additional time for the user if he/she is measuring side-by-side rooms (such as offices or classrooms down a corridor). The dialog prompts the user to simply measure a length and width of each consecutive side-by-side room, assuming that the room is rectangular, which allows the user to only need to measure two of the four walls in the room. When 'OK(8)' is selected, the entire room is created in the AutoCAD file.

FIG. 8 shows a sample user interface screen of an embodiment of the present invention for the Add Stairs dialog box. This dialog enables the user to measure a set of stairs. It prompts the user to measure the length of the stairwell, the width, the vertical height from the top of the top riser to the bottom of the bottom riser, to enter the number of risers, to determine the rotation angle from the active wall, the size of the lip on the stairs, and to enter the direction of the stairs (up or down) from the active wall.

FIGS. 9 & 10 show sample user interface screens of an embodiment of the present invention for the Add Fixture dialog box and the Add Furniture dialog box. Both dialogs use similar code and functionality. The dialog boxes allow the user to measure the location of a fixture (appliances, light switches, etc. . . . ) or a furnishing object (sofa, chair, etc. . . . ) in a room. The dimensions measured are relative to the active wall. The objects are selected from a drop down listbox containing a list of objects from a file of pre-created AutoCAD models of fixtures and furnishings. The user has the option to select which side of the active wall on which the object should be placed in the file.

Figure 11:
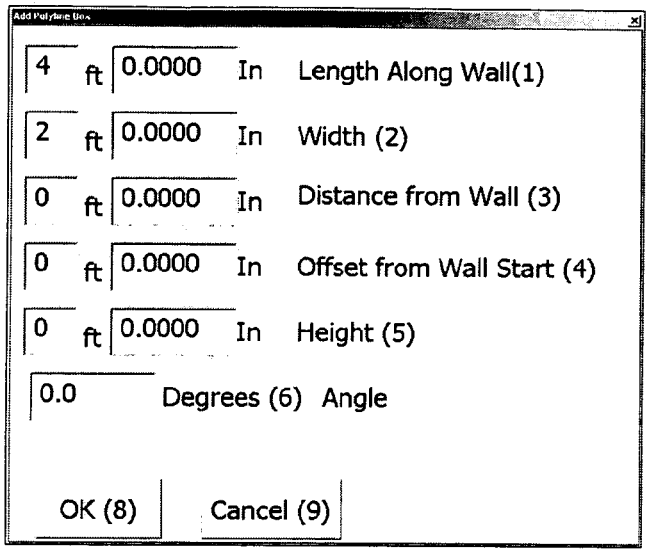
FIG. 11 shows a sample user interface screen of an embodiment of the present invention for the Add Polyline Box dialog box.

FIG. 11 shows a sample user interface screen of an embodiment of the present invention for the Add Polyline Box dialog box. In AutoCAD files, objects are often represented using a linetype in AutoCAD called a polyline. There are times that users will want to represent something as a polyline in a file. This dialog box enables a user to measure the dimensions of an object as well as its location relative to the active wall and upon selecting 'OK(8)', the object is created in the AutoCAD file as a polyline structure. A couple good examples of objects that can often be represented by a polyline are a wall soffit or a built-in radiator.

Figure 12:
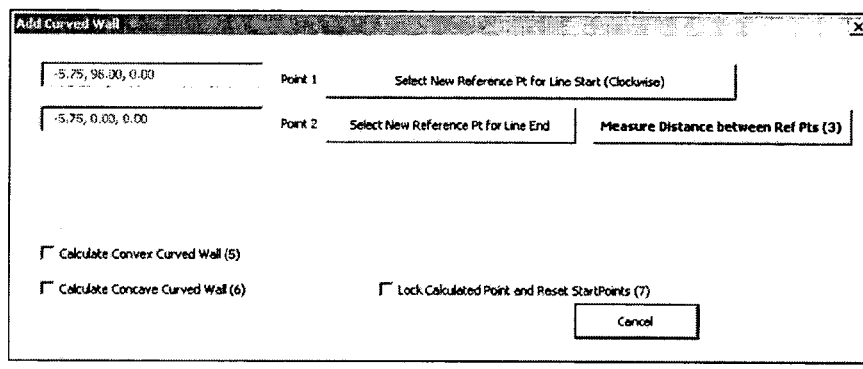
FIG. 12 shows a sample user interface screen of an embodiment of the present invention for the Add Curved Wall dialog box.

FIG. 12 shows a sample user interface screen of an embodiment of the present invention for the Add Curved Wall dialog box. This dialog prompts the user to measure the length and the arc of a curved wall. The user is prompted to measure certain distances in the room, relative to the active wall, which are represented by color-coded temporary lines that appear in the AutoCAD file. Once the distances are measured, the code uses triangulation formulas to determine the arc and the endpoints of the curved wall and creates the curved wall in the AutoCAD file.

Figure 13:
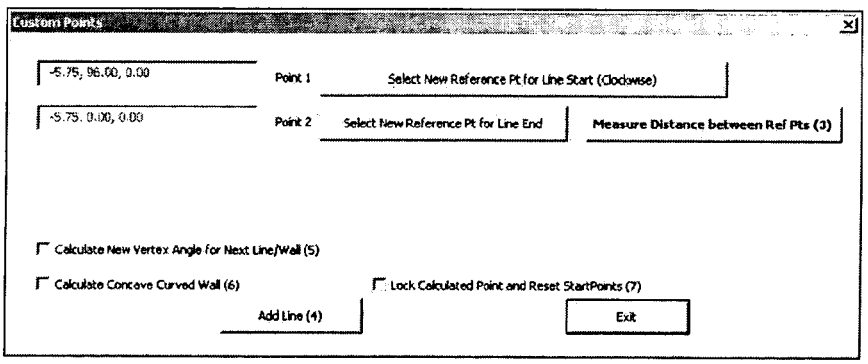
FIG. 13 shows a sample user interface screen of an embodiment of the present invention for the Custom Points dialog box.

FIG. 13 shows a sample user interface screen of an embodiment of the present invention for the Custom Points dialog box. This dialog prompts the user to select a point on the screen to use as reference point for measurements. Triangulation formulas can then be used to determine the location of other points by measuring the distances from the selected point.

Figure 14:
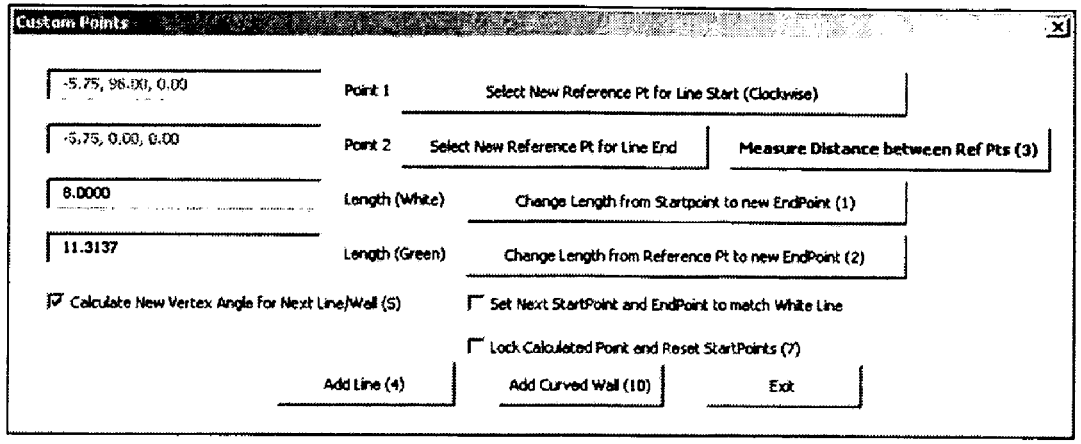
FIG. 14 shows a sample user interface screen of an embodiment of the present invention for the Custom Points dialog box.

FIG. 14 shows a sample user interface screen of an embodiment of the present invention for the Custom Points dialog box. This dialog prompts the user to take measurement(s) from specifically selected points. These distances can then be used in triangulation formulas to determine the location of other points and/or angles which can then be used to calculate the location and direction of walls or objects.

Figure 15:
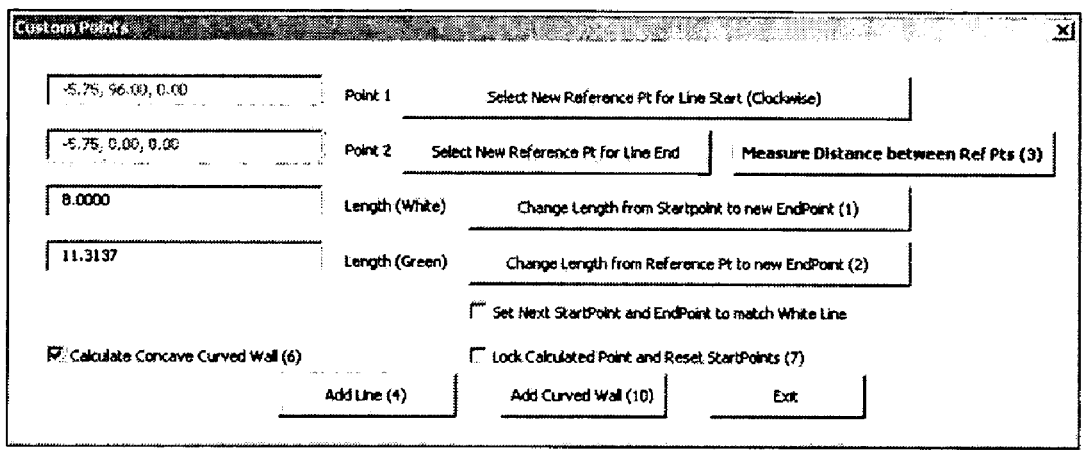
FIG. 15 shows a sample user interface screen of an embodiment of the present invention for the Custom Points dialog box.

FIG. 15 shows a sample user interface screen of an embodiment of the present invention for the Custom Points dialog box. This dialog prompts the user to take measurement(s) from specifically selected points. These distances can then be used in triangulation formulas to determine the location of other points and/or angles which can then be used to calculate the location, direction and curvature of a curved wall.

Figure 16:
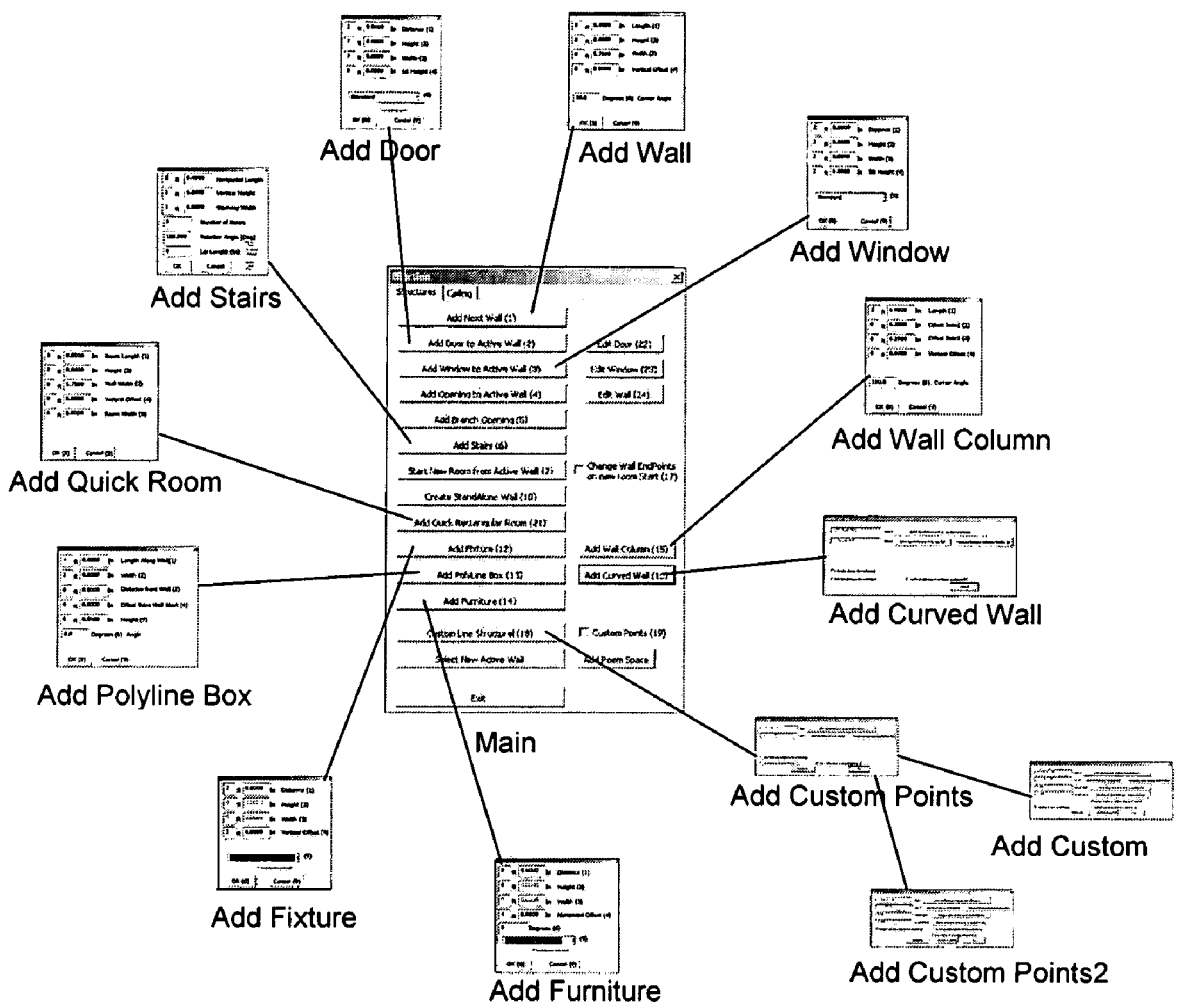
FIG. 16 shows the process flow of the sample user interface screens of an embodiment of the present invention.

FIG. 16 is a flow chart of the computer screens for creating a computer model according an embodiment of to the present invention.

Thus, a preferred method of creating a computer model includes the following steps:

Step 1: The user launches the Eflection software program on a computing device, such as a laptop, PC, PDA, or similar device.

Step 2: The user clicks the "Create StandAlone Wall" button on the main Eflection dialog box by either (a) using the mouse, or (b) entering the designated number on the keypad of the laser measuring device. This launches the "Add Wall" dialog box.

Step 3: The user measures the length of a wall using the laser measuring device and when the measurement is taken, the program receives the measurement and populates the "length" field with the measurement. The user advances the cursor to the next field either using the mouse, keyboard, or by entering the designated number of the next field into the keypad of the laser measuring device.

Step 4: The user repeats the (above) procedure to measure the height of the wall.

Step 5: The user uses a tape measure (or similar device) to measure the thickness of the wall, generally at a doorway, window, or other opening where the thickness is visible. This measurement is entered into the program using either the keyboard or the keypad of the laser measuring device.

Step 6: The user clicks the "OK" button on the "Add Wall" dialog box either using the mouse cursor or using the keypad of the laser.

Step 7: The user observes the computer screen to ensure that the computer generated wall has been created properly.

Step 8: The user then moves around the interior of the room in which he/she currently is operating. As the user encounters architectural objects (wall, window, door, stairs, etc. . . . ) he/she launches the corresponding dialog box from the main Eflection dialog box and takes measurements to populate each field in the dialog box (see FIGS. 1–14).

Step 9: The user repeats the above steps moving from room to room throughout the architectural structure until the entire structure has been measured and a 3D file has been created.

What is claimed is:

1. A method of creating a 3 dimensional ("3-D") computer model rendering of a plurality of rooms of an architectural structure comprising the steps of:
   (a) launching a computer-aided design software program adapted to received measurements from a laser measuring device and operative to create a computer model of a room on a computing device;
   (b) launching a dialog box of the software program by either using a mouse, or entering the designated number on the laser measuring devices;
   (c) measuring a length of a wall of a room using the laser measuring device;
   (d) transmitting the wall length measurement to the computing device;
   (e) receiving the wall length measurement by the program
   (f) populating a length field in the dialog box with the wall length measurement;
   (g) measuring a height of the wall using the laser measuring device;
   (h) transmitting the wall height measurement to the computing device;
   (i) receiving the wall height measurement by the program;
   (j) populating a height field with the wall height measurement;
   (k) determining a thickness of the wall;
   (l) inputting the wall thickness measurement into the program by manual entry into the computing device or by transmission by the laser measuring device and receiving by the program;
   (m) accepting a rendering of the wall generated by the program by manual entry into the computing device or with the laser measuring device and thereby confirming the computer generated wall rendering has been created properly;
   (n) moving around the interior of the room and repeating selected ones of steps (a) through (m) a plurality of times for each of a selected combination of architectural objects;
   (o) moving to at least one more room in the architectural structure and repeating step (n) a selected number of times until a desired portion of the structure has been measured and the computer model rendering of the plurality of rooms of the architectural structure has been created.

2. The method of claim 1, wherein the plurality of rooms of an architectural structure comprises all rooms of the architectural structure and the computer model is a model of the entire structure.

3. A computer system for forming a virtual model of a three-dimensional interior space, the computer system comprising:

a logic device capable of executing instructions embodied as software, wherein the logic device includes a display component;

a laser measuring device communicatively coupled to the logic device, wherein the laser measuring device is capable of creating measurement data by measuring a plurality of spans, and wherein the laser measuring device includes a user interface;

a software portion configured to receive a first user input identifying at least one structural category, wherein each of the at least one structural categories determines a plurality of structural measurement fields;

a software portion configured to receive from the laser measuring device measurement data;

a software portion configured to uniquely map each measurement data to at least one of the plurality of structural measurement fields of the at least one structural category;

a software portion configured to form on the display component a rendition of the identified structural category based on the measurement data mapped to the plurality of structural measurement fields;

a software portion to receive from the user interface a second user input identifying at least one structural object, wherein the at least one structural object is associated with the identified at least one structural category, and wherein the identified at least one structural object determines a plurality of object measurement fields;

a software portion configured to uniquely map measurement data to at least one of the plurality of object measurement fields of the at least one structural object; and a software portion configured to modify the rendition of the identified structural category based on the measurement data mapped to the plurality of object measurement fields.

* * * * *